(12) United States Patent
Whitfield et al.

(10) Patent No.: US 12,241,536 B2
(45) Date of Patent: Mar. 4, 2025

(54) STRAIN WAVE GEARING SYSTEM

(71) Applicant: Goodrich Actuation Systems Limited, Wolverhampton (GB)

(72) Inventors: Neil Stuart Russell Whitfield, Shifnal (GB); Jack William Timms, Wolverhampton (GB)

(73) Assignee: GOODRICH ACTUATION SYSTEMS LIMITED, West Midlands (GB)

( * ) Notice: Subject to any disclaimer, the term of this patent is extended or adjusted under 35 U.S.C. 154(b) by 0 days.

(21) Appl. No.: 18/541,177

(22) Filed: Dec. 15, 2023

(65) Prior Publication Data
US 2024/0200644 A1    Jun. 20, 2024

(30) Foreign Application Priority Data
Dec. 16, 2022 (EP) .................................. 22214382

(51) Int. Cl.
*F16H 49/00* (2006.01)
*B64C 13/34* (2006.01)

(52) U.S. Cl.
CPC .......... *F16H 49/001* (2013.01); *B64C 13/34* (2013.01); *F16H 2049/003* (2013.01)

(58) Field of Classification Search
CPC .. F16H 49/001; F16H 2049/003; B64C 13/34
USPC ........................................................ 74/640
See application file for complete search history.

(56) References Cited

U.S. PATENT DOCUMENTS

| 9,494,223 | B2 | 11/2016 | Jensen | |
| 2022/0186787 | A1* | 6/2022 | Thompson | F16H 49/001 |
| 2023/0235815 | A1* | 7/2023 | Cao | F16H 57/043 |
| | | | | 74/89.22 |
| 2023/0383835 | A1* | 11/2023 | Bartell | F16H 57/023 |
| 2024/0044401 | A1* | 2/2024 | Tanioka | F16H 49/001 |
| 2024/0318708 | A1* | 9/2024 | Balsiger | F16H 37/122 |

FOREIGN PATENT DOCUMENTS

| CN | 106090183 A | 11/2016 |
| DE | 102016116438 B3 | 1/2018 |
| DE | 102017111381 A1 | 11/2018 |
| EP | 2460198 B1 | 4/2016 |

(Continued)

OTHER PUBLICATIONS

Abstract for CN106090183(A), Published: Nov. 9, 2016, 1 page.
(Continued)

*Primary Examiner* — Ha Dinh Ho
(74) *Attorney, Agent, or Firm* — CANTOR COLBURN LLP

(57) ABSTRACT

A strain wave gearing system is includes: wave generator; a rigid spline; a flex spline disposed between the wave generator and the rigid spline; and a coupling element. The flex spline comprises a first mating element. The coupling element comprises a second mating element. The coupling element and the flex spline are mated by cooperation of the first mating element and the second mating element so as to prevent rotational motion of the flex spline relative to the coupling element. The first mating element is movable relative to the second mating element to thereby permit deformation of the flex spline relative to the coupling element.

15 Claims, 9 Drawing Sheets

(56) References Cited

FOREIGN PATENT DOCUMENTS

| | | |
|---|---|---|
| EP | 3312475 A2 | 4/2018 |
| EP | 3780358 A1 | 2/2021 |
| WO | 2011012532 A1 | 2/2011 |

OTHER PUBLICATIONS

Abstract for DE102016116438 (B3), Published: Jan. 18, 2018, 1 page.
Abstract of DE102017111381 (A1), Published: Nov. 29, 2018, 1 page.
European Search Report, for Application No. 22214382.8, mailed May 15, 2023, 9 pages.

* cited by examiner

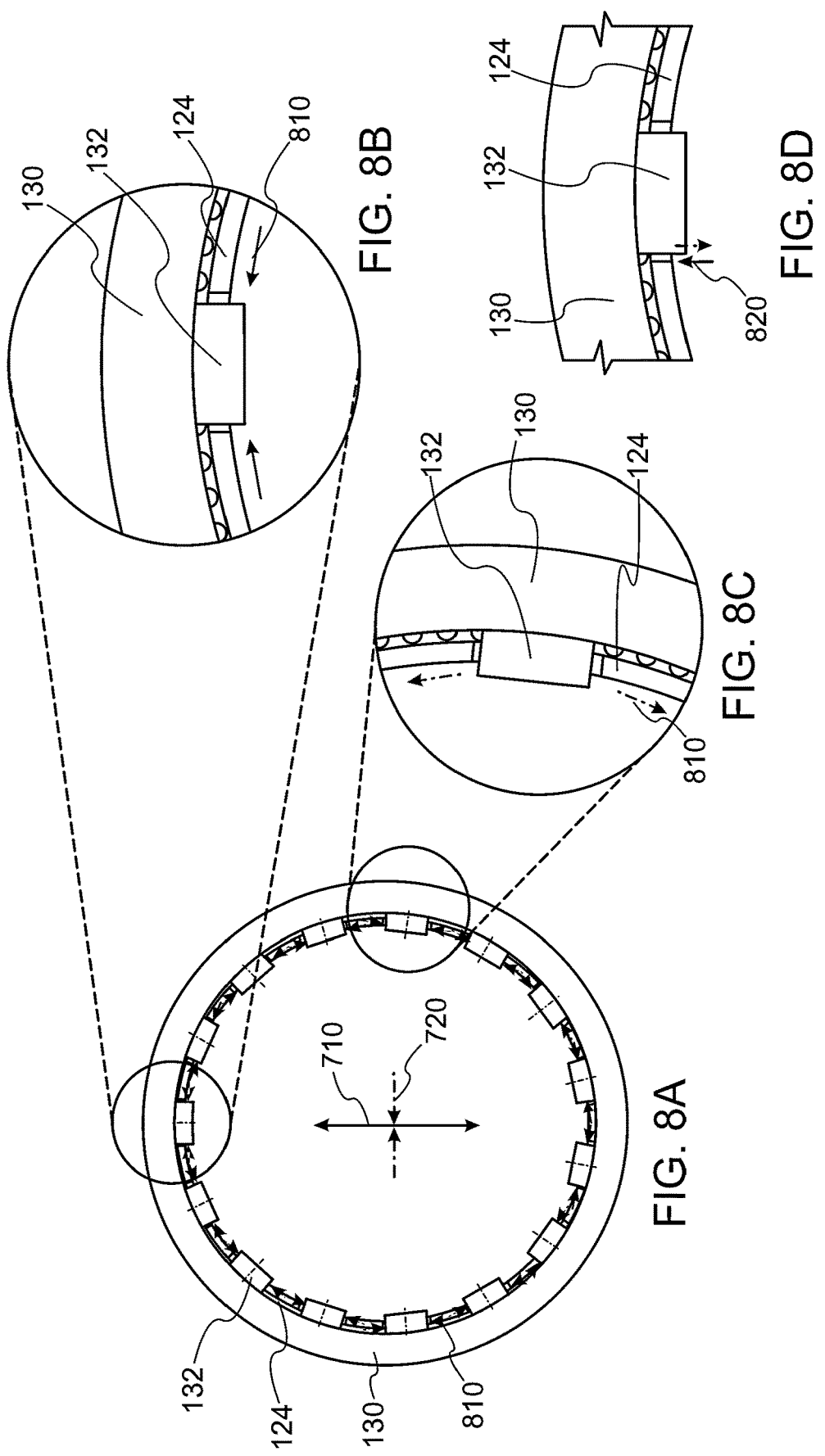

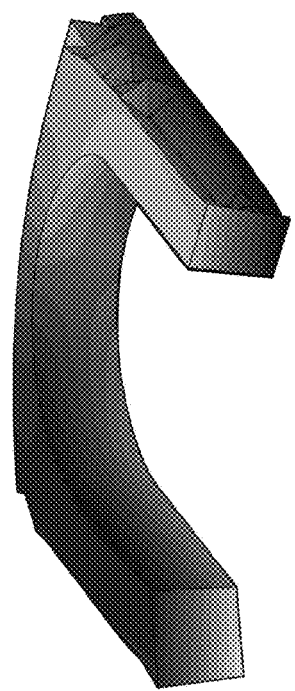
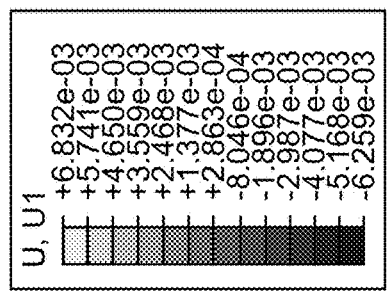
FIG. 9B
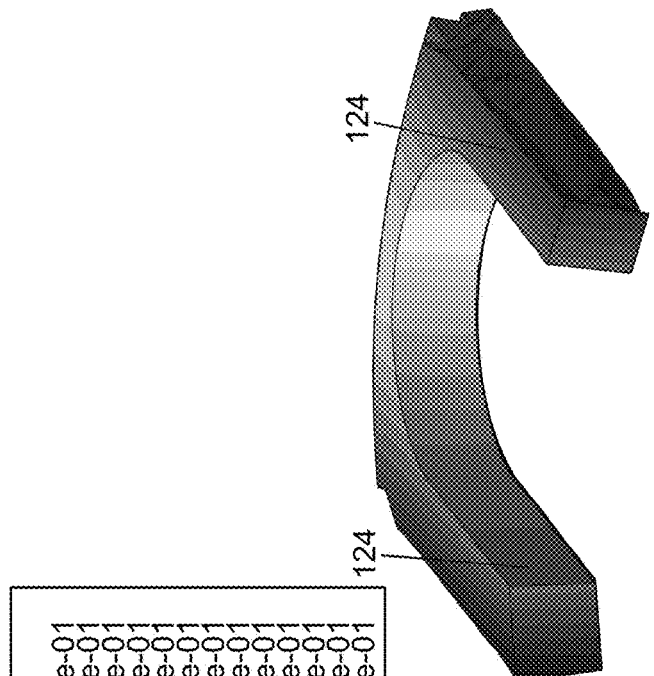
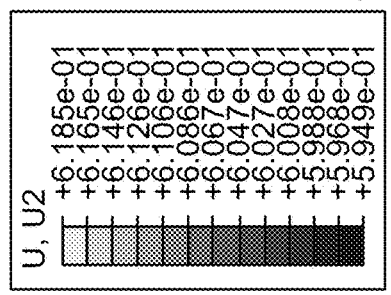
FIG. 9A

STRAIN WAVE GEARING SYSTEM

CROSS REFERENCE TO RELATED APPLICATIONS

This application claims priority to European Patent Application No. 22214382.8 filed Dec. 16, 2022, the entire contents of which is incorporated herein by reference.

TECHNICAL FIELD

The invention relates to a strain wave gearing system, and particularly to a strain wave gearing system comprising a flex spline with a mating element mated with a mating element of a coupling element.

BACKGROUND

Strain wave gearing systems, also known as harmonic drives, are a type of mechanical gear system that can improve certain characteristics compared to other gearing systems used for similar applications, such as helical gears or planetary gears. Strain wave gearing systems can provide high gear reduction ratios in a small volume, so gearboxes comprising strain wave gearing systems can be highly compact and lightweight. Strain wave gearing systems also experience little or no backlash.

A typical strain wave gearing system comprises a flex spline shaped like a cup arranged inside a cylindrical rigid spline. A closed end of the flex spline is fixedly connected to an output shaft to which torque is transmitted. The side walls of the flex spline are relatively thin, allowing an open end of the flex spline to deform elastically when fit over a wave generator assembly. A typical wave generator comprises an elliptical plug fixedly attached to an input shaft and surrounded by bearings or another mechanism that allows the wave generator to rotate within the flex spline. The flex spline includes teeth positioned radially around the outside of the flex spline. The cylindrical rigid spline includes teeth arranged radially around the inside. Because the wave generator has an elliptical shape, when the wave generator is inserted into the open end of the flex spline and deforms the flex spline, the teeth of the flex spline engage with the teeth of the cylindrical rigid spline at only two points (located on the major axis of the wave generator's ellipse). The cylindrical rigid spline has a different (e.g. greater) number of teeth than the flex spline. Therefore, as the wave generator rotates (e.g. 180°) within the flex spline, the engagement of the flex spline and cylindrical rigid spline causes the flex spline to rotate (e.g. by one tooth) relative to the cylindrical rigid spline.

The cup-shaped flex spline of such typical strain wave gearing systems is subject to non-uniform deformation along its length, as the open end is deformed by the wave generator and the closed end is relatively rigid. This can lead to increased fatigue within the flex spline. To reduce wear, the length of the flex spline is increased as necessary to allow the required deformation.

The present invention aims to reduce wear and fatigue, and improve the durability and lifetime of a strain wave gearing system. It also seeks to provide a more compact strain wave gearing system.

SUMMARY

According to a first aspect of the invention there is provided a strain wave gearing system comprising: a wave generator; a rigid spline; a flex spline disposed between the wave generator and the rigid spline, the flex spline comprising a first mating element; and a coupling element comprising a second mating element; wherein the coupling element and the flex spline are mated by cooperation of the first mating element and the second mating element so as to prevent rotational motion of the flex spline relative to the coupling element; and wherein the first mating element is movable relative to the second mating element to thereby permit deformation of the flex spline relative to the coupling element.

The coupling element and the flex spline may therefore be rotationally locked by cooperation of the first mating element and the second mating element, but the flex spline may nevertheless be able to deform relative to the coupling element, and may hence be able to function normally as the flex spline of the strain wave gearing system. The first mating element may therefore slide in and out (e.g. radially) relative to the second mating element. Since the first mating element and the second mating element can move relative to each other, the first mating element (and the adjacent portion of the flex spline) may be deformed (e.g. inwards and/or outwards) by action of the wave generator. The first mating element may therefore be moveable radially inwards and/or outwards relative to the second mating element of the coupling element. The first mating element may therefore be arranged for limited movement relative to the second mating element e.g. radial movement, but not circumferential movement. Thus, while torque may be transferred between the first mating element and the second mating element (and therefore between the flex spline and the coupling element), stresses from deformation of the flex spline may not be transferred to the coupling element. The flex spline can therefore deform (e.g. into an ellipse or oval) without deforming the coupling element, and thus the coupling element may experience less fatigue and wear. Thus, the radial restraint applied to the flex spline is removed.

The first mating element may have only a single degree of freedom with respect to the second mating element. That is, the first mating element may only be able to move in one dimension compared to the second mating element. For example, the first mating element may move inwards and outwards (e.g. radially) relative to the second mating element, but may not move in other direction e.g. axially and/or circumferentially.

In a typical strain wave gearing system, the flex spline deforms into an ellipse by action of the (typically elliptical) wave generator. As the wave generator rotates about its axis, the major axis of the ellipse of the flex spline also rotates e.g. around the circumference of the flex spline. The flex spline may therefore engage with the rigid spline along the major axis of the ellipse, and disengage with the rigid spline along the minor axis of the ellipse. Thus, the portion of the flex spline engaged with the rigid spline progresses around the circumference of the flex spline as the wave generator rotates.

Since the first mating element can move relative to the second mating element (e.g. radially in and out), then the flex spline can deform into the required elliptical shape, but the stresses of that deformation are not transferred to the coupling element. However, since the first and second mating elements cooperate to prevent relative rotation of the flex spline and coupling element, torque can be transferred between the flex spline and coupling element. The coupling element may therefore be fixed to thereby prevent its rotation, and subsequently prevent rotation of the flex spline, which in turn results in rotation of the rigid spline e.g. as an output of the strain wave gearing system. The coupling element may therefore be an earth element (e.g. an earth annulus) in the sense that it earths torque from the flex spline e.g. if fixed to a stationary element of an aircraft. Alternatively, the rigid spline may be fixed, so that the flex spline rotates, which in turn results in rotation of the coupling element. In that case, the coupling element may be an output of the strain wave gearing system e.g. connected to an output shaft or the like. In either case though, the stresses caused by deformation of the flex spline are not transferred to the coupling element.

The first mating element may be a flex mating element e.g. because it is a part of flex spline. The second mating element may be a rigid mating element e.g. because it is a part of the coupling element, which may also be substantially rigid. The first mating element and second mating element may be immediately adjacent each other e.g. on respective rims of the flex spline and coupling element. The first mating element may abut the second mating element in a circumferential direction e.g. a circumferential direction of the flex spline and/or the coupling element. That is, the first mating element and second mating element may be immediately adjacent each other about the circumference of the coupling element (and/or flex spline). The second mating element may therefore be arranged to permit radial movement of the first mating element, but to prevent relative rotational movement thereof, to thereby prevent relative rotational movement of the flex spline compared to the coupling element. The second mating element may not be movable, or may only be rotatable rigidly with the rest of the coupling element. Thus, the second mating element may not move radially inwards and/or outwards, unlike the first mating element.

The strain wave gearing system may have an axial direction e.g. defined by an axis about which the wave generator rotates. Directions perpendicular to the axial direction may be referred to herein as radial. The wave generator, flex spline, coupling element and rigid spline may be coaxial. References herein to e.g. axial, radial and circumferential may be understood as being in relation to the axis about which the wave generator rotates.

The wave generator may be fixedly attached to a shaft (e.g. an input shaft) defining an axis. The wave generator may have a non-circular profile e.g. oval or elliptical. For example, the wave generator may have an elliptical outer profile, wherein the major axis and minor axis of the wave generator's ellipse are perpendicular to the axis of the shaft. The wave generator may have bearings (e.g. roller bearings) at its interface with the flex spline. Alternatively, the wave generator may include a non-circular wave generator plug and a bearing that is mated (e.g. press-fit) around the circumference of the wave generator plug. The bearings at the interface between the wave generator and the flex spline may facilitate different relative angular speeds of wave generator and flex spline e.g., the bearings may allow the flex spline to be rotationally still while the wave generator rotates about the axis of the shaft, or the bearings may allow the flex spline to rotate about the axis of the shaft at a lower angular speed to the wave generator e.g. in the event that the rigid spline is stationary during use.

The flex spline may be substantially annular e.g. an annulus or tube. The flex spline may have externally facing teeth and may have a nominal (e.g. undeformed) diameter that is less than the length of the major axis of the wave generator and more than the length of the minor axis of the wave generator. The flex spline may be coaxial with the wave generator and/or the shaft. The flex spline may fit over the wave generator such that the flex spline is deformed by the non-circular shape of the wave generator. The flex spline may not conform exactly to the shape of the wave generator e.g. it might not be in contact with the wave generator at the minor axis.

The flex spline may be open at both ends. The flex spline may be free to deform radially along its entire axial length e.g. from one open end to the other. Thus, during use the cross-section of the flex spline may be elliptical along its whole length. The cross-section of the flex spline may be constant along its whole length e.g. at all times during use.

The rigid spline may be substantially annular e.g. a rigid annulus or ring. The rigid spline may not deform during use, and may therefore cooperate with the deforming flex spline. The rigid spline may therefore be substantially rigid. The rigid spline may have internally facing teeth, and a different number of (e.g. two more) teeth compared to the flex spline. The rigid spline may be coaxial with the wave generator and/or shaft. The teeth of the flex spline may engage (e.g. mesh) with the teeth of the rigid spline only at certain points. For example, the wave generator may deform the flex spline into an ellipse, and the flex spline may engage with the rigid spline only at points coincident with the major axis of the ellipse. At points coincident with the minor axis of the ellipse, the teeth of the flex spline may not engage with the teeth of the rigid spline, allowing the flex spline to rotate (e.g. about the axis of the shaft) relative to the rigid spline.

The coupling element may be substantially annular e.g. be an annulus. The coupling element may be substantially rigid, and therefore may not deform during use (hence the second mating element therefore may not move radially inwards and/or outwards). The coupling element may be engaged with the flex spline by a dogged arrangement, or by a keyed joint. The strain wave gearing system may therefore comprise dogs to receive/transmit (e.g. earth) the torque from the flex spline. The arrangement of first mating element and second mating element may prevent or impart movement of the flex spline through physical engagement. The arrangement may hold the flex spline in place by blocking, clamping, or otherwise obstructing its movement via the first mating element (e.g. in the event that the coupling element is rotationally fixed). Alternatively, the arrangement may couple the coupling element and flex spline so that they rotate in unison.

The first mating element is moveable relative to the second mating element therefore, an interface may exist between the first mating element and the second mating element. The first mating element may slide relative to the second mating element, passing the second mating element at the interface.

Optionally, the first mating element is adjacent the second mating element. The first mating element may be adjacent the second mating element in a circumferential direction of the coupling element and/or flex spline. The first mating element and second mating element may comprise opposed faces e.g. a face of the first mating element may oppose a face of the second mating element. The opposed faces may abut each other to thereby transfer torque between the flex spline and the coupling element. The opposed faces may abut each other in a circumferential direction. The opposed faces may be arranged to allow radial movement of the first mating element relative to the second mating element e.g. the face of the first mating element may move (e.g. slide) past the face of the second mating element.

Optionally, the strain wave gearing system comprises a plurality of coupling elements mated with the flex spline in series. There may be a first coupling element mated to the flex spline at a first axial end of the flex spline. The flex spline may also be mated to a second coupling element at a second axial end of the flex spline.

Optionally, the flex spline comprises the first mating element at a first axial end of the flex spline; the flex spline comprises a third mating element at an opposing second axial end of the flex spline; and the strain wave gearing system comprises a second coupling element comprising a fourth mating element; wherein the second coupling element and the flex spline are mated by cooperation of the third mating element of the flex spline and the fourth mating element of the second coupling element, so as to prevent rotational motion of the flex spline relative to the second coupling element.

Thus, the flex spline may have mating elements on either end, and a respective coupling elements mated thereto, each at a respective end of the flex spline. The flex spline may therefore be rotationally locked to two coupling elements, by respective mating elements (i.e. the first mating element and third mating element). The first coupling element and second coupling element may therefore both be rotationally locked to each other e.g. they both may not rotate, or may rotate in unison.

The third mating element of the flex spline may be identical in construction to the first mating element, albeit on an opposite end of the flex spline. The fourth mating element of the second coupling element may be identical in construction to the second mating element. The third mating element and fourth mating element may therefore comprise the features of the first mating element and second mating element respectively, as described herein. The second coupling element may be substantially the same as the first coupling element, and may therefore comprise the features of the first coupling element as recited herein. In short, the arrangement mating the first coupling element and flex spline, may be substantially the same as the arrangement mating the flex spline and second coupling element.

Optionally, the flex spline is a first flex spline, and the second coupling element is mated to a second flex spline. There may therefore be a series or chain of flex splines with coupling elements interposed between them. The strain wave gearing system may therefore rotationally lock a series of flex spline e.g. earthing torque for each of the flex splines via the coupling element(s). There may be multiple wave generators along the length of the shaft, each wave generator having e.g. a corresponding flex spline and rigid spline. That is, there may be a plurality of wave generators, a plurality of flex splines, and a plurality of rigid splines. There may be a coupling element between each pair of flex splines, as well as a coupling element at the axially outer side of the axially outermost flex splines e.g. on the ends of the chain. Each coupling between a flex spline and coupling element may comprise mating elements as described herein with reference to the first mating element and second mating element.

All pairings of a flex spline and a corresponding rigid spline may have the same gear ratio, and be linked to the same output. For example, the shaft may be an input shaft and each rigid spline may be connected to the same output. In another example, the shaft be an input shaft and each coupling element may be connected to the same output. The resulting series arrangement of flex splines could divide the torque applied by the input shaft between all of the flex splines, while still applying the same total torque to the output. Advantageously, each flex spline may experience a reduced torque load relative to the total torque applied by the input shaft, reducing the stress experienced by each flex spline.

Optionally, at least one of the first mating element and the second mating element comprises a friction reducing surface feature. The friction reducing surface feature may facilitate relative movement (e.g. radial movement) of the first mating element relative to the second mating element. The friction reducing surface feature may be any suitable property or device that reduces friction between the mating elements. For example, the friction reducing surface feature may be a hardened surface, a roller element, a lubricant, and so on. For example, roller elements may be provided between the first mating element and the second mating element (and between any adjacent mating elements as required).

At least one of the third mating element and the fourth mating element may comprise a friction reducing surface feature as well, where they are provided. The mating elements may be made from a wear-resistant material. The mating elements may be hardened to increase their resistance to wear. A bearing element (e.g. a roller bearing) may be provided at the opposed surface between mating elements, for example between a first mating element and a second mating element, or between a third mating element and a fourth mating element, and so on. An alternative friction reducing surface feature could be a surface coating. The mating elements may be lubricated to facilitate relative movement therebetween. Any suitable means to improve radial movement between the mating elements and reduce wear may be provided.

Optionally, the flex spline comprises a first plurality of mating elements. Each of the first plurality of mating elements may comprise a tab. The coupling element may comprise a second plurality of mating elements. Each of the second plurality of mating elements may comprise a tab. The first plurality of tabs may engage with the second plurality of tabs to thereby prevent rotational motion of the flex spline relative to the coupling element. Thus, the flex spline may comprise a plurality of mating elements (e.g. first mating elements) on its end, and distributed about its circumference e.g. on its rim. The coupling element may comprise a plurality of mating elements (e.g. second mating elements) on its end, and distributed about its circumference e.g. on its rim.

The first plurality of mating elements may be either a plurality of the first mating elements or a plurality of the third mating elements. The second plurality of mating elements may be a plurality of the second mating elements or a plurality of the fourth mating elements. Each mating element of the first plurality of mating elements may extend axially from the flex spline. Each mating element of the second plurality of mating elements may extend axially from the end of the coupling element. Each mating element of the first plurality of mating elements may be adjacent a mating element of the second plurality of mating elements. Each mating element of the first plurality may be disposed between neighbouring mating elements of the second plurality, and vice versa. That is, the mating elements may be interleaved with each other e.g. about the circumference of the flex spline and/or coupling element on their respective ends.

The coupling element and the flex spline may be therefore be mated by opposed, interleaved tabs e.g. like interlocked fingers of opposing hands. Each tab of the flex spline may therefore be held by neighbouring tabs of the coupling element so that relative rotational movement of the flex spline and the coupling element is not possible, but each tab of the flex spline may move radially (e.g. inwards and/or outwards) relative to the neighbouring tabs of the coupling element. Of course, each tab of the coupling element may also be held by neighbouring tabs of the flex spline. The tabs of the coupling element may have sufficient radial thickness such that the tabs of the coupling element always abut the tabs of the flex spline in the circumferential direction.

Neighbouring first mating elements of the flex spline may therefore capture a second mating element of the coupling element, and may therefore provide a dog, and specifically a rotational dog, which prevents relative rotation but allows axial movement. Typically a dog prevents or imparts movement through physical engagement. The neighbouring first mating elements may hold the second mating element in place by blocking it, clamping it, or otherwise obstructing its movement e.g. rotational movement. Or the neighbouring first mating elements may couple with the second mating element so that they rotate in unison.

An increased number of mating elements (e.g. tabs) may distribute torque more evenly. Mating elements (e.g. tabs) may be manufactured to have flat mating faces, leading to a relatively large contact area between each first mating element and adjacent second mating element(s), thus contact stresses may be relatively small. Tabs may be any shape that allows the mating elements to transmit torque while simultaneously permitting relative radial movement. For example, tabs may be involute, or there may be space between tabs at full engagement.

When the flex spline deforms e.g., into an ellipse or oval, the tabs of the first plurality of mating elements (of the first mating elements and/or the third mating elements, where provided) may correspondingly deform. For example, the radius of curvature of the flex spline may reduce towards the major axis of the ellipse i.e., the flex spline may become more curved. Correspondingly, the tabs may become more curved towards the major axis, and the spaces between tabs may become effectively narrower. The tabs comprising the first mating elements may therefore engage more strongly with the second mating elements towards the major axis of the ellipse than towards the minor axis of the ellipse. For example, the clearance between the first mating elements and the second mating elements may reduce. The first mating elements may pinch or close on the second mating elements. Correspondingly, the tabs comprising a third mating element may engage more strongly with the tabs comprising a fourth mating element towards the major axis of the ellipse than towards the minor axis of the ellipse. As a result, the flex spline may transfer torque to the coupling element(s) more effectively towards the major axis of the ellipse than towards the minor axis of the ellipse. Advantageously, as the flex spline engages with the rigid spline at the major axis of the ellipse, thereby transmitting torque to the rigid spline at the major axis of the ellipse, the narrowing of the gaps between mating elements towards the major axis results in a more uniform distribution of stresses about the circumference of the flex spline.

Optionally, one of the flex spline or the coupling element comprises a plurality of mating elements, wherein each of the plurality of mating elements comprises a tab; and the other of the flex spline and the coupling element comprises a plurality of pins; wherein the plurality of tabs engages with the plurality of pins to thereby prevent rotational motion of the flex spline relative to the coupling element.

Each of the first plurality of pins may be adjacent a tab, substantially as described above in respect of the interleaved tabs. Each pin may be disposed between neighbouring tabs, and vice versa. That is, the pins may be interspersed with the tabs e.g. about the circumference of the flex spline and/or coupling element.

The coupling element and the flex spline may therefore be mated by opposed, interleaved pins and tabs. Each tab may therefore be held by neighbouring pins—and vice versa—so that relative rotational movement of the flex spline and coupling element is not possible, but each tab (or pin) of the flex spline may move radially (e.g. inwards and outwards) relative to the neighbouring pins (or tabs) of the coupling element.

The tabs may extend in the axial direction, and/or the pins may extend in the radial direction. The pins may be manufactured separately and fixedly attached to the relevant one of the coupling element or the flex spline during assembly. Alternatively, the pins may be integrally formed with the relevant one of the coupling element or the flex spline. The pins may extend radially inwards from the coupling element or the flex spline, or may extend radially outwards.

Any suitable arrangement of mating elements may be provided between (each) flex spline and (respective) coupling element. Any suitable number of mating elements may be provided to rotationally lock the two components, while permitting deformation of the flex spline according to its required function in the strain wave gearing system.

Each mating element may be radially moveable relative to its immediately adjacent mating elements. Each mating element may be rotationally locked relative to its immediately adjacent mating elements.

The strain wave gearing system may not comprise any fixings and/or fastenings connecting the coupling element to the flex spline. For example, the flex spline may not be bolted to the coupling element. The flex spline may couple to the coupling element only by cooperation of their shapes.

Optionally, the average position of the first mating element over time relative to the second mating element is fixed. The first mating element may move radially inwards and outwards relative to the second mating element.

Optionally, the strain wave gearing system comprises lubrication between the first mating element and the second mating element.

According to a second aspect of the invention there is provided an aircraft comprising the strain wave gearing system of the preceding aspect, wherein the strain wave gearing system is operable to actuate a flight control surface.

Optionally, the flight control surface is a leading-edge flap.

Optionally, the coupling element is fixedly attached to the aircraft so as not to rotate relative thereto, and the rigid spline is engaged with an actuator for the flight control surface. In this case, the rigid spline provides the output of the strain wave gearing system.

The coupling element may be fixedly attached to an airframe of the aircraft e.g., a spar of an aircraft wing, thereby earthing torque of the flex spline. The rigid spline may rotate relative to the aircraft and the rotation of the rigid spline may actuate the flight control surface.

Optionally, the coupling element is engaged with an actuator for the flight control surface, and the rigid spline is fixedly attached to the aircraft so as not to rotate relative thereto.

The rigid spline may be fixedly attached to an airframe of the aircraft e.g., the rigid spline may be fixedly attached to a spar of an aircraft wing, thereby earthing the strain wave gearing system. The flex spline, and therefore the coupling element, may be rotatable relative to the aircraft and the rotation of the coupling element may actuate the flight control surface.

According to a third aspect of the invention there is provided a method of assembling a strain wave gearing system according to the first aspect, comprising mating the first mating element and the second mating element to thereby mate the flex spline and the coupling element.

The coupling element may be coupled to the flex spline without the need for permanent or temporary fixings e.g. bolts. The omission of fixings may make disassembling or maintaining the strain wave gearing system simpler.

The method may comprise assembling and/or providing the strain wave gearing system as recited herein with reference to the first aspect of the invention. The method may comprise providing and/or using any of the features as recited herein with reference to the first aspect of the invention. The strain wave gearing system of the first aspect may be suitable for use with the method of third aspect.

According to another aspect of the invention, there is provided a strain wave gearing system, comprising a flex spline which is deformable relative to a coupling element. The strain wave gearing system may comprise any of the features as recited herein with reference to any aspect of the invention.

BRIEF DESCRIPTION OF THE DRAWINGS

Certain exemplary embodiments will now be described in greater detail by way of example only and with reference to the accompanying drawings in which:

FIGS. 8A to 8D show a cross-section of a flex spline and a coupling element of a strain wave gearing system with details of the mating elements; and FIGS. 9A and 9B show the deformation of the mating elements of a flex spline of a strain wave gearing system.

DETAILED DESCRIPTION

Figure 1:
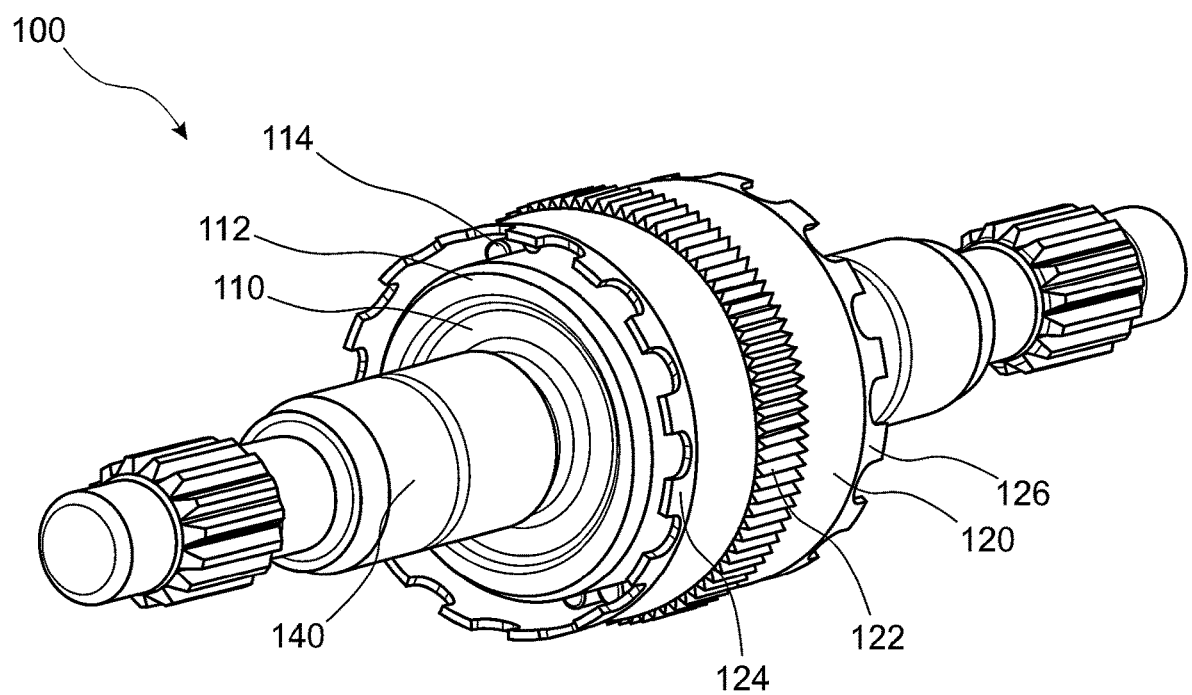
FIG. 1 shows part of a strain wave gearing system.
Figure 2:
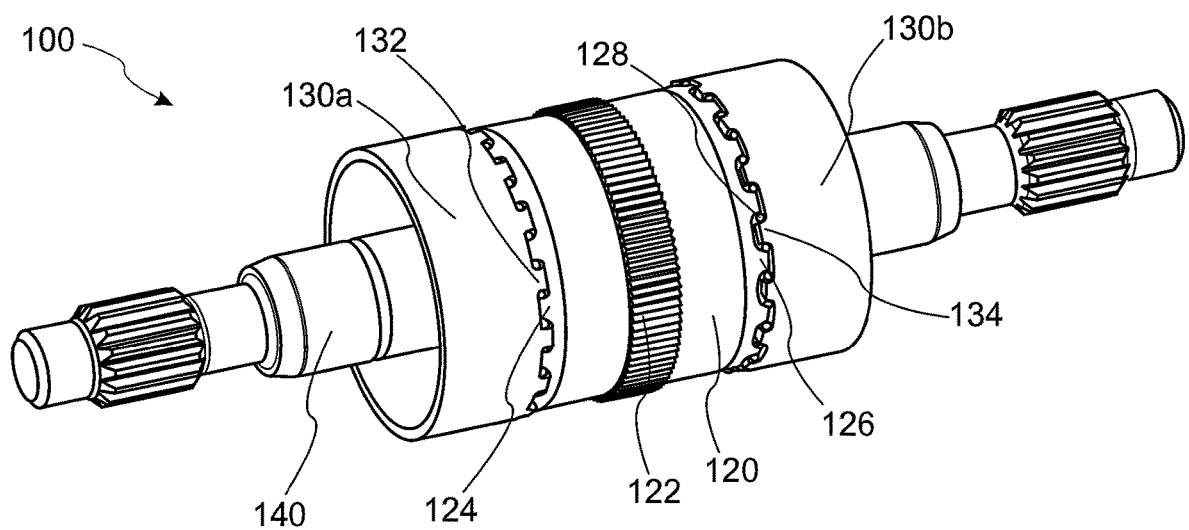
FIG. 2 shows part of a strain wave gearing system with a series of coupling elements.

As shown schematically in FIGS. 1 and 2, a strain wave gearing system 100 includes a wave generator 110 comprising a wave generator plug 112 and a roller bearing 114; a flex spline 120; a first coupling element 130a and an optional second coupling element 130b. The wave generator 110 is fixedly attached to a shaft 140, so as to rotate therewith. The wave generator plug 112 has an elliptical profile. The shaft 140 may be an input shaft. The coupling elements 130a, 130b may be fixedly attached to an external feature (e.g. of an aircraft) and therefore not rotatable. A rigid spline of the strain wave gearing system 100 may connect to an output for actuation by the strain wave gearing system 100. The rigid spline may be provided around the flex spline 120 so as to cooperate with teeth 122 thereof. Alternatively, the coupling elements 130a, 130b may connect to an output and the rigid spline may be fixedly attached to an external feature so as to be stationary. Thus, either the coupling element(s) 130a, 130b or the rigid spline may be used as an output, depending on how the strain wave gearing system 100 is arranged. As a further alternative, one of the rigid spline, or the coupling elements 130a, 130b, may be connected to an input, the other of the rigid spline and the coupling elements 130a, 130b may be fixedly attached to an external feature, and the shaft 140 may be an output shaft.

Figure 3A:
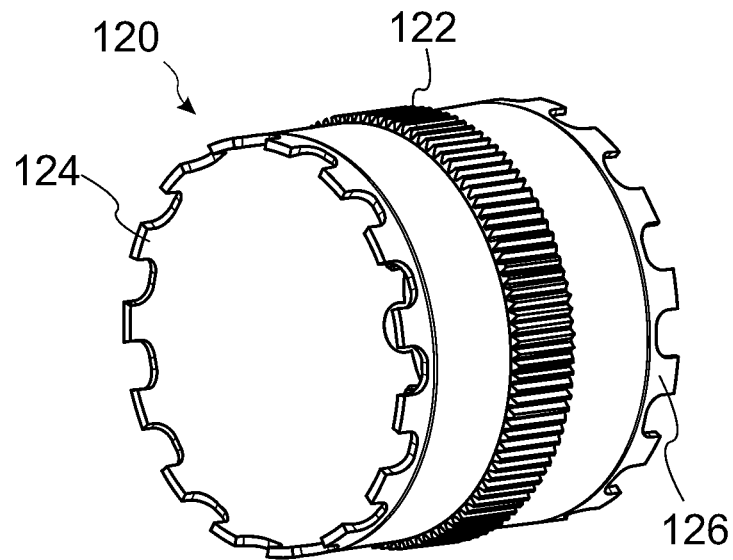
FIGS. 3A and 3B shows a flex spline of a strain wave gearing system.
Figure 3B:
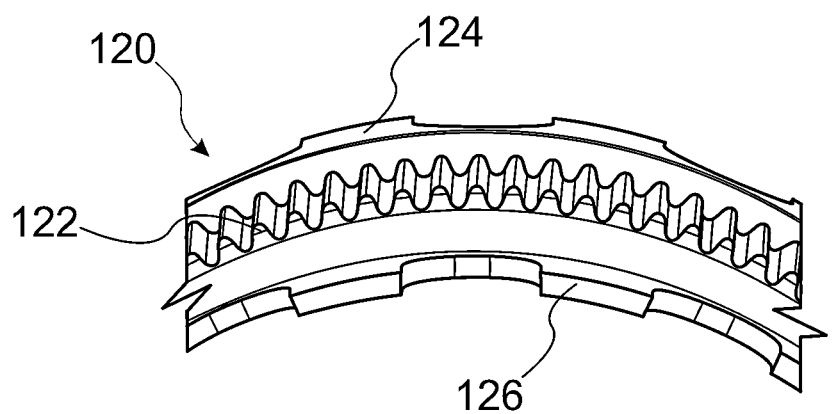

The flex spline 120 has a tubular profile, as shown in the schematic FIG. 3A. The flex spline 120 comprises teeth 122 located around an outer circumference of the flex spline 120. When the flex spline 120 is fitted over the wave generator 110, the flex spline 120 is deformed into an ellipse by the wave generator 110 such that the teeth 122 that are coincident with the major axis of the wave generator plug 112 engage with corresponding teeth of the rigid spline. The teeth 122 may have any profile that allows the teeth 122 to engage with the teeth of the rigid spline to transmit torque between the flex spline 120 and the rigid spline. For example, as shown in FIG. 3B, the teeth 122 may have an involute profile, which may advantageously reduce stress concentrations on the surface of the teeth 122 and reduce backlash. The flex spline 120 further comprises a plurality of first mating elements 124 at a first axial end, each of which engages with a plurality of second mating elements 132 of the first coupling element 130a. The flex spline 120 optionally comprises a plurality of third mating elements 126 at a second axial end, each of which engages with a plurality of fourth mating elements 134 of the optional second coupling element 130b.

Figure 4:
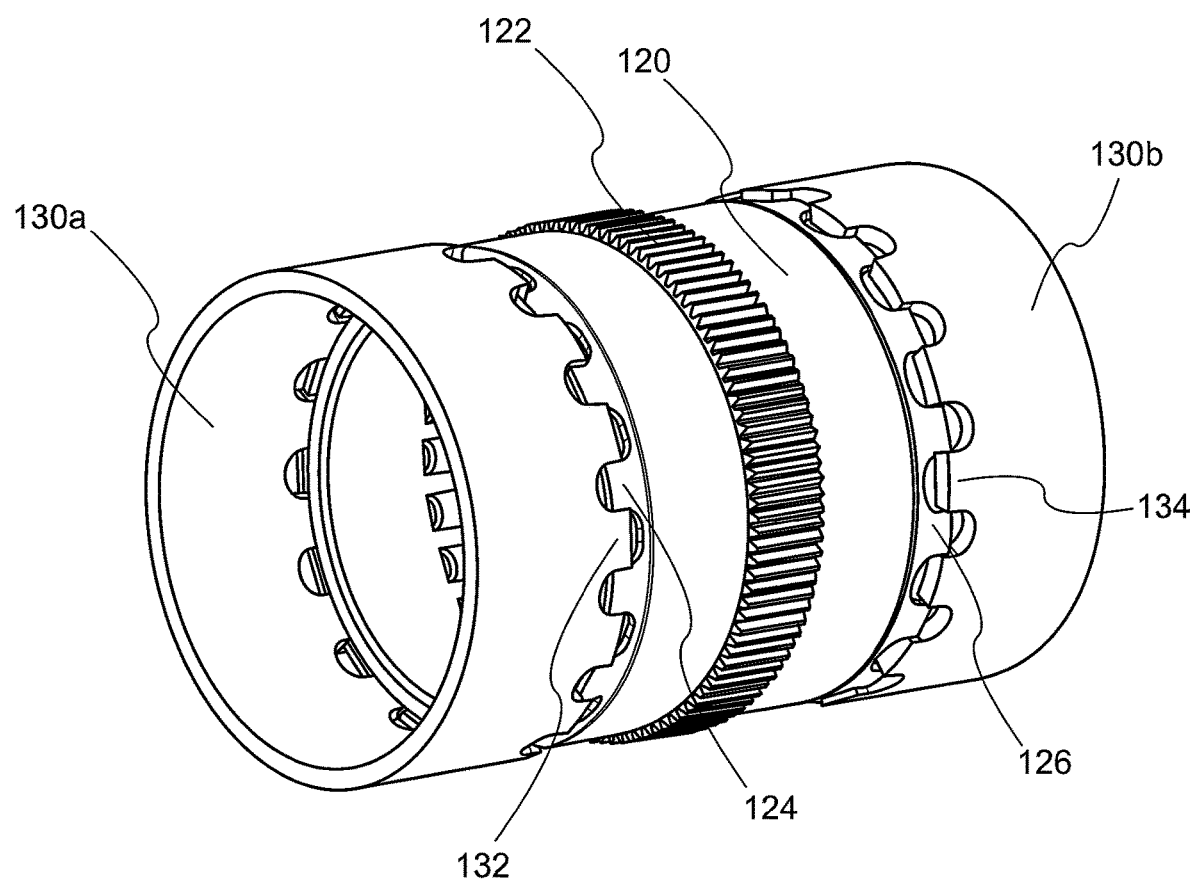
FIG. 4 shows a flex spline and coupling elements of another strain wave gearing system.

FIG. 4 shows the flex spline 120 and two coupling elements 130a, 130b in isolation. As shown, the plurality of first mating elements 124 and the plurality of third mating elements 126 comprise a plurality of tabs 124, 126 extending axially from a first axial end and a second axial end of the flex spline 120, respectively. The plurality of second mating elements 132 and the plurality of fourth mating elements 134 also comprise a plurality of tabs 132, 134 extending axially from an axial end of the first coupling element 130a and the second coupling element 130b, respectively. The tabs 124, 126 of the flex spline 120 are interleaved between the tabs 132, 134 of the coupling elements 130a, 130b in the circumferential direction. That is, each of the plurality of tabs 124 comprising the plurality of first mating elements 124 fits between a corresponding pair of the plurality of tabs 132 comprising the plurality of second mating elements 132. Each of the plurality of tabs 126 comprising the plurality of third mating elements 126 meshes with the plurality of tabs 134 comprising the plurality of fourth mating elements 134.

The second coupling element 130b is optional, and the strain wave gearing system 100 can comprise only a single flex spline 120 and only a single coupling element 130a. However, by virtue of the mating elements 124, 132, 126, 134 it is possible to chain a plurality of coupling elements 130a, 130b with one—or even a plurality of—flex spline(s) 120. The description herein of the mating between the flex spline 120 and the first coupling element 130a should be understood to apply to any mating between a flex spline and coupling element.

The tabs 124, 126 of the flex spline 120 engage with the corresponding tabs 132, 134 of the coupling elements 130a, 130b such that the flex spline 120 is circumferentially held in a substantially fixed manner with respect to the coupling elements 130a, 130b. However, the engagement of the tabs 124, 132, 126, 134 does not prevent a radial sliding motion between the tabs 124, 126 of the flex spline 120 and the tabs 132, 134 of the coupling elements 130a, 130b.

By the arrangement of tabs 124 about the circumference of the rim of the flex spine 120 at one end, and the tabs 132 about the circumference of the rim of the coupling element 130, the flex spline 120 and coupling element 130a are rotationally fixed relative to each other. However, the flex spline 120 is not prevented from being deformed by the wave generator plug 112 in order to perform its normal function as a flex spline 120 of the strain wave gearing system 100. The tabs 124 can move radially inwards and outwards as the flex spline 120 deforms, while still staying caught between adjacent tabs 132 of the first coupling element 130a. As such, torque can be transferred between the flex spline 120 and the first coupling element 130a, without the wear and fatigue caused by necessary deformation of the flex spline 120. The same applies to the tabs 126 at the opposite end of the flex spline 120 and the tabs 134 of the second mating element 130b.

An interface may exist between the first mating elements 124 and the second mating elements 132, or between the third mating elements 126 and the fourth mating elements 134. The mating elements of the flex spline 120 may abut directly against the mating elements of the coupling element 130, for example the first mating elements 124 may abut directly against the second mating elements 132, as shown in FIG. 4. The interface between mating elements may include a friction reducing surface feature. For example, the face of each first mating element 124 that abuts a second mating element 132 may be hardened. The interface between mating elements may be lubricated to reduce friction. Another friction reducing surface feature could be the inclusion of a bearing element between mating elements, for example the rolling elements 128 shown in FIG. 2. The rolling elements 128 may be provided between adjacent mating elements to facilitate relative movement therebetween.

Although tabs 124, 132 are shown in FIG. 4, any suitable arrangement of first mating element 124 and second mating element 132 that allows deformation of the flex spline 120 while preventing rotation of the flex spline 120 relative to the coupling element 130a would be possible.

Figure 5:
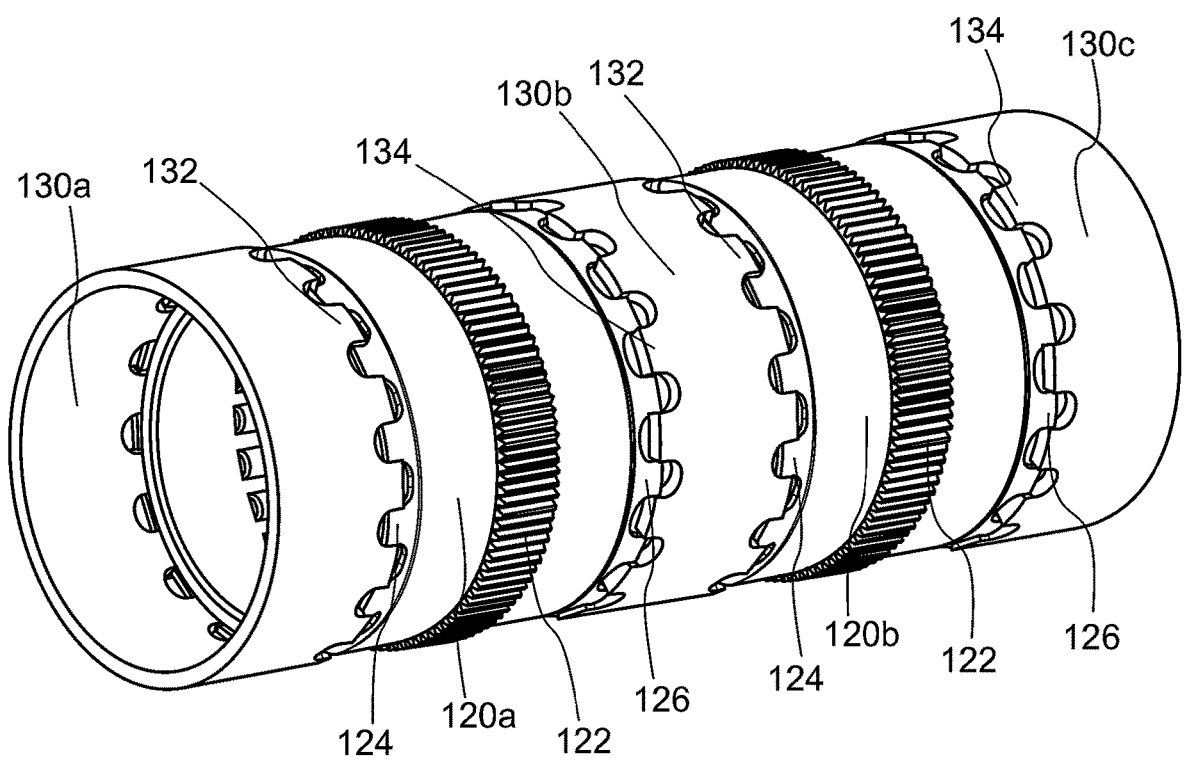
FIG. 5 shows multiple mated flex splines and coupling elements of another strain wave gearing system.

The strain wave gearing system 100 may comprise a plurality of wave generators 110 and a plurality of flex splines 120a, 120b, wherein each flex spline 120a, 120b of the plurality of flex splines 120a, 120b is engaged with a respective rigid spline, and pairs of flex splines 120a, 120b of the plurality of flex splines 120a, 120b are coupled by a coupling element e.g. second coupling element 130b. To achieve this, the second coupling element 130b that is located between flex splines 120a and 120b comprises the ('second') mating element 132 at a first axial end, to mate with the ('first') mating element 124 of the second flex spline 120b, and the ('fourth') mating element 134 at a second, opposing axial end, to mate with the ('third') mating element 126 of the first flex spline 120a. This arrangement, as shown in part in FIG. 5, allows a single shaft 140 to interact with a plurality of flex splines 120a, 120b, as well as and a plurality of rigid splines.

Thus, each interface between a flex spline 120 and adjacent coupling element 130 can be achieved by the cooperation and interaction of mating elements as shown in e.g. the figures. Specifically, pairs of the second mating elements 132 of the coupling element 130 capture a first mating element 124 of the flex spline 120, but permit relative one-dimensional movement thereof. Thus, the first mating elements 124 of the flex spline 120 can move radially inwards and outwards, but remain captured between pairs of mating elements 132 of the coupling element 130 so that both the coupling element 130 and flex spline 120 are rotationally fixed relative to each other. Pairs of first mating elements 124 of the flex spline 120 also capture second mating elements 132 of the coupling element 130.

Figure 6:
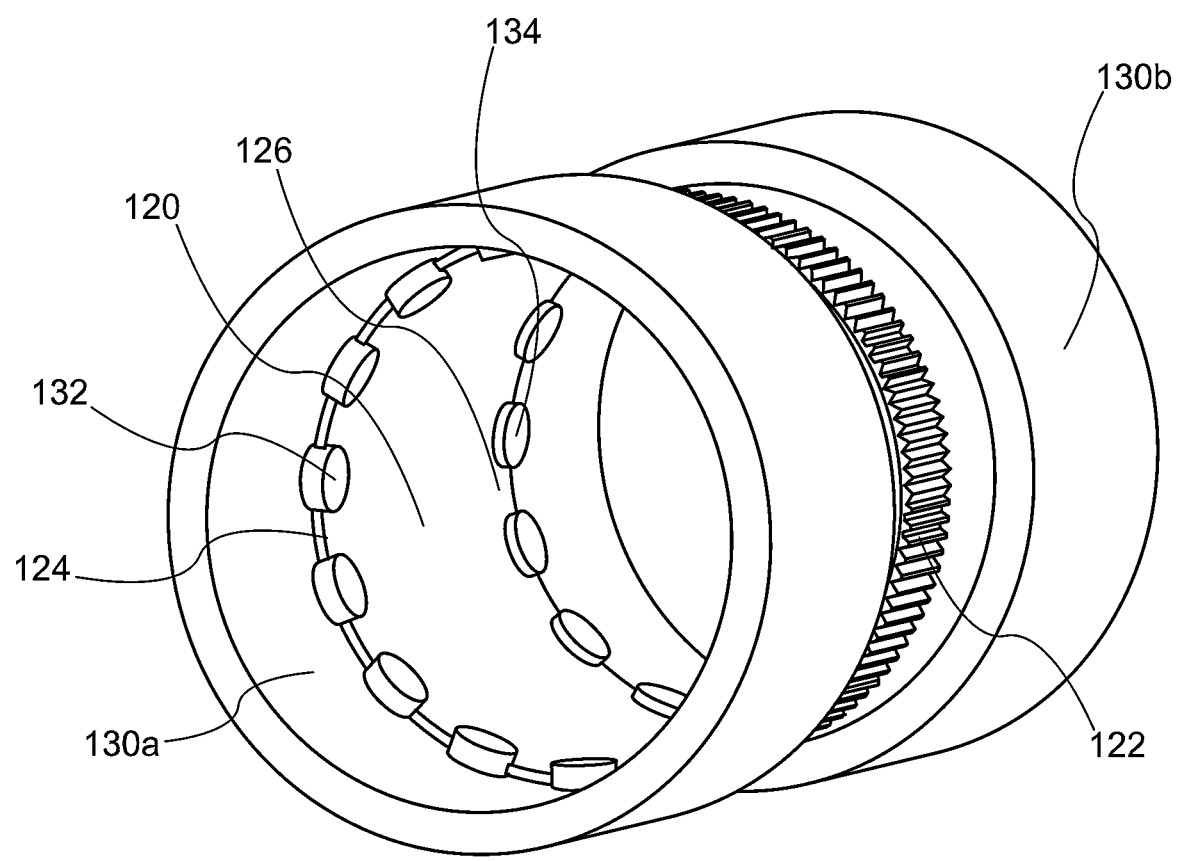
FIG. 6 shows a flex spline and coupling elements of another strain wave gearing system.
Figure 7C:
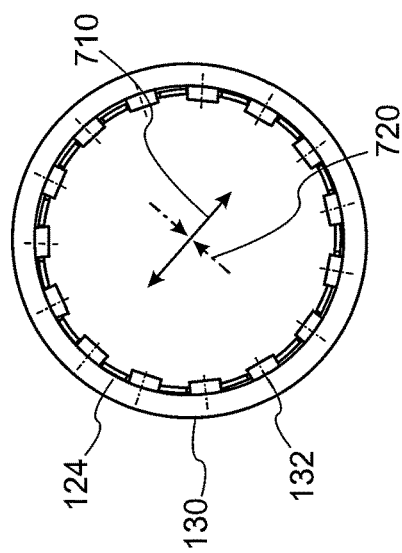
FIGS. 7A to 7E show a cross-section of a flex spline and a coupling element of a strain wave gearing system.
Figure 7B:
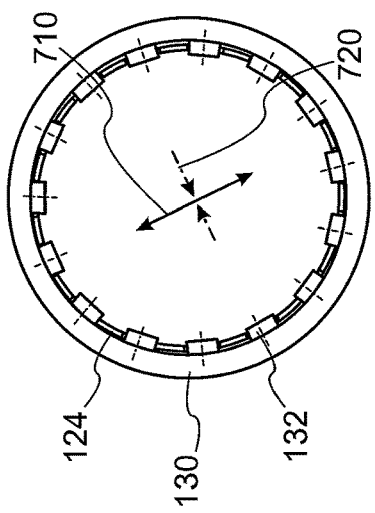
Figure 7A:
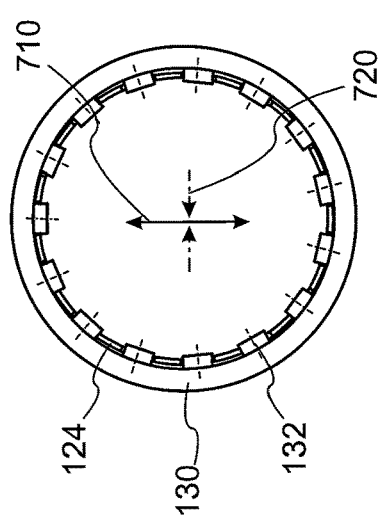
Figure 7E:
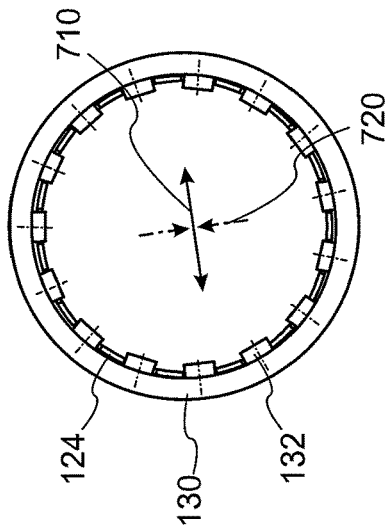
Figure 7D:
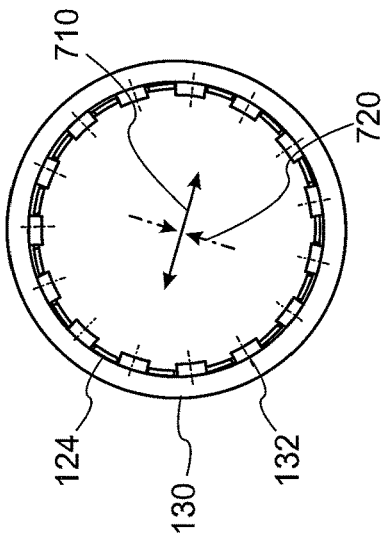

Any suitable arrangement of mating elements between the flex spline 120 and coupling element 130 can be used, such as the tabs 124, 132 shown in FIGS. 1 to 5. An alternative configuration of mating elements is depicted in FIG. 6, specifically, as an alternative configuration for the second mating element 132 of the first coupling element 130a and fourth mating element 134 of the second coupling element 130b. In the alternative configuration of FIG. 6, the flex spline 120 is as described above, with external teeth 122 to mate with the internal teeth of a rigid spline, a plurality of first mating elements 124 at a first axial end comprising a plurality of tabs 124, and a plurality of second mating elements 126 at a second axial end comprising a plurality of tabs 126. The first coupling element 130a and the second coupling element 130b have a larger diameter than the effective diameter of the flex spline 120 along the major axis of the wave generator 110. The first coupling element 130a comprises a plurality of second mating elements 132, the plurality of second mating elements 132 comprising a plurality of pins 132 extending radially inwards. The plurality of pins 132 that comprise the plurality of second mating elements 132 are sized and spaced to fit between the tabs 124 that constitute the plurality of first mating elements 124. The second coupling element 130b comprises a plurality of fourth mating elements 134, the plurality of fourth mating elements 134 comprising a second plurality of pins 134 extending radially inwards. The second plurality of pins 134 engages with the tabs 126 that form the plurality of third mating elements 126.

As described above in relation to the interlocked tabs of FIGS. 1 to 5, pairs of pins 132, 134 capture tabs 124, 126 of the flex spline therebetween, while allowing the tabs 124, 126 to move inwards and outwards, and therefore enabling the flex spline 120 to deform in order to function normally. Pairs of mating element may therefore be considered to be dogs, and to permit applied torque to be reacted across both sides. The number, size and spacing of the mating elements can be tailored for the necessary application, and any suitable size, number and configuration may be used.

Both the tab-based arrangement, and the pin/tab-based arrangement allow simple assembly of the strain wave gearing system 100, as the coupling element 130 and flex spline 120 can be simply mated by cooperation of the tabs and/or pins. This results in reduced unit complexity, reduced part count (e.g. because fixings are not needed), as well as simplified assembly, disassembly and maintenance. It may also reduce weight, cost, and assembly time. Further, the necessary mating arrangements may be achieved using convention machining techniques, which in turn may be cheaper, more reliable, and have better tolerances.

FIG. 7 shows a cross-section through the flex spline 120 and the coupling element 130, and shows the mating elements 124 and 132. For example, the cross section is taken through the flex spline 120 and coupling element 130 at the location of the plurality of first mating elements 124 and the plurality of second mating elements 132. In each of FIGS. 7A-7E the major axis 710 of the ellipse of the flex spline 120 is shown by outward facing arrows, and the minor axis 720 of the ellipse of the flex spline 120 is shown by inward facing arrows. Through the progression of FIGS. 7A-7E, the major axis 710 (and minor axis 720) rotates anti-clockwise with the rotation of the wave generator 110. The wave generator 110 therefore deforms the flex spline 120 as it rotates. As can be seen from FIGS. 7A-7E, the first mating elements 124 that are located toward the major axis 710 of the ellipse are positioned further radially outwards than those first mating elements 124 located toward the minor axis 720 of the ellipse. The plurality of second mating elements 132 do not move radially. A small gap can therefore be seen between the coupling element 130 and the flex spline 120 on the line of the minor axis 720.

Thus, the first mating elements 124 of the flex spline 120 move radially inwards and outwards relative to the second mating elements 132 of the coupling element 130. However, the average position of each first mating element 124 is fixed relative to each second mating element 132. Stress, fatigue and wear experienced by the flex spline 120 because of its deformation does not get passed to the coupling element 130.

FIG. 8 shows the same cross-section as FIG. 7. The deformation of the flex spline 120 is shown by the arrows 810 in FIG. 8A. As shown in FIG. 8B, at points on the major axis 710 of the ellipse, the plurality of first mating elements 124 are displaced radially outwards, the radius of curvature of the flex spline 120 is decreased, and the space between first mating elements 124 is reduced. Therefore, the clearance between the first mating elements 124 and the second mating elements 132 may reduce (e.g. the first mating elements 124 may pinch or close on the second mating elements 132) at points coincident with the major axis 710 of the ellipse. Shown in FIG. 8C are the points on the minor axis 720 of the ellipse. At these points, the plurality of first mating elements 124 are displaced radially inwards, the radius of curvature of the flex spline 120 is increased, and the space between first mating elements 124 is increased. The transmission of torque between the flex spline 120 and coupling elements 130a, 130b may therefore be coincident with the major axis 710 of the ellipse. As the first mating elements 124 move radially inwards and outwards, and the second mating elements 132 do not move radially, and there is sliding at the interface between the first mating elements 124 and the second mating elements 132, as shown in FIG. 8D by arrows 820.

Thus, the space between the first mating elements 124 is reduced in size at points on the major axis 710 of the wave generator, and increased at points on the minor axis 720. The mating elements will therefore experience sliding as a result of the entire flex spline 120 deforming to fit the wave generator 110. The surfaces of the mating elements 124, 132 may therefore be hardened and/or lubricated to reduce wear.

Some of the negative effects of the sliding may be mitigated through the change in spacing between the mating elements 124 of the flex spline 120 as a result of deformation. The spacing increases in size as the first mating elements 124 reach the minor axis 720 of the wave generator, meaning the spacing away from the loaded spline teeth 122 will have a reduced load.

FIG. 9 shows an example analysis of the deformation undergone by a space between e.g. first mating elements 124 of the flex spline 120, for example a slot between a pair of first mating elements 124. In the example shown in FIG. 9A, the width of the slot between first mating elements 124 is 5 mm. The flex spline 120 and therefore the slot between first mating elements 124 undergoes a maximum lift i.e., a maximum radial movement, of e.g. 0.6184 mm. The corresponding reduction in the width of the slot i.e., the lateral movement of each mating element 124 is 6.8 μm, and therefore the reduction in the distance between first mating elements 124 is 13.6 μm, as shown in FIG. 9B. The first mating elements 124 and second mating elements 132 may therefore be configured to reduce the risk of pinching. Any suitable size of mating elements and slots may be used, and the disclosure herein is not limited to the specific dimensions presented in the example of FIG. 9.

Advantageously, the system and method described herein provide for improved characteristics of a flex spline of a strain wave gearing system. Embodiments of the present invention may allow for more uniform stress distributions within a flex spline over the prior art. Preventing the deformation of a flex spline at a point may result in non-uniform stresses over the length of the flex spline, leading to increased fatigue and may increase the necessary length of flex spline required to allow for sufficient deformation. By allowing the flex spline to deform over its entirety, the present invention may use a flex spline of reduced length, decreasing the size, weight and cost of the strain wave gearing system. The present invention may also allow for uniform deformation of the flex spline, resulting in uniform stress distributions that reduce the fatigue of the flex spline, and reduced wear of flex spline teeth. As a result, the durability and lifetime of a strain wave gearing system may be improved. The strain wave gearing system may also employ multiple coupling elements engaged with a flex spline, and/or multiple flex splines in engagement with a single input, allowing for multiple outputs, or reduced torque loading of individual flex splines.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

The invention claimed is:

1. A strain wave gearing system comprising:
   a wave generator;
   a rigid spline;
   a flex spline disposed between the wave generator and the rigid spline, the flex spline comprising a first mating element; and
   a coupling element comprising a second mating element;
   wherein the coupling element and the flex spline are mated by cooperation of the first mating element and the second mating element so as to prevent rotational motion of the flex spline relative to the coupling element; and
   wherein the first mating element is movable relative to the second mating element to thereby permit deformation of the flex spline relative to the coupling element.

2. The strain wave gearing system of claim 1, wherein the first mating element is adjacent the second mating element.

3. The strain wave gearing system of claim 1, comprising a plurality of coupling elements mated with the flex spline in series.

4. The strain wave gearing system of claim 1, wherein:
the flex spline comprises the first mating element at a first axial end of the flex spline;
the flex spline comprises a third mating element at an opposing second axial end of the flex spline; and
the strain wave gearing system comprises a second coupling element comprising a fourth mating element;
wherein the second coupling element and the flex spline are mated by cooperation of the third mating element and the fourth mating element of the second coupling element, so as to prevent rotational motion of the flex spline relative to the second coupling element.

5. The strain wave gearing system of claim 4, wherein the flex spline is a first flex spline, and wherein the second coupling element is mated to a second flex spline.

6. The strain wave gearing system of claim 1, wherein at least one of the first mating element and the second mating element comprises a friction reducing surface feature.

7. The strain wave gearing system of claim 1, wherein:
the flex spline comprises a first plurality of mating elements, wherein each of the first plurality of mating elements comprises a tab; and
the coupling element comprises a second plurality of mating elements, wherein each of the second plurality of mating elements comprises a tab;
wherein the first plurality of tabs engages with the second plurality of tabs to thereby prevent rotational motion of the flex spline relative to the coupling element.

8. The strain wave gearing system of claim 1, wherein:
one of the flex spline or the coupling element comprises a plurality of mating elements, wherein each of the plurality of mating elements comprises a tab; and
the other of the flex spline and the coupling element comprises a plurality of pins;
wherein the plurality of tabs engages with the plurality of pins to thereby prevent rotational motion of the flex spline relative to the coupling element.

9. The strain wave gearing system of claim 1, wherein the average position of the first mating element over time relative to the second mating element is fixed.

10. The strain wave gearing system of claim 1, comprising lubrication between the first mating element and the second mating element.

11. An aircraft comprising:
a strain wave gearing system of claim 1, wherein the strain wave gearing system is operable to actuate a flight control surface.

12. The aircraft of claim 11, wherein the flight control surface is a leading-edge flap.

13. The aircraft of claim 11, wherein the coupling element is fixedly attached to the aircraft so as not to rotate relative thereto, and the rigid spline is engaged with an actuator for the flight control surface.

14. The aircraft of claim 11, wherein the coupling element is engaged with an actuator for the flight control surface, and the rigid spline is fixedly attached to the aircraft so as not to rotate relative thereto.

15. A method of assembling a strain wave gearing system as claimed in claim 1, the method comprising:
mating the first mating element and the second mating element to thereby mate the flex spline and the coupling element.

* * * * *